United States Patent [19]

Bontrager

[11] Patent Number: 5,765,912
[45] Date of Patent: Jun. 16, 1998

[54] BICYCLE SADDLE HAVING RESILIENT FORWARD NOSE

[75] Inventor: Keith D. Bontrager, Santa Cruz, Calif.

[73] Assignee: Trek Bicycle Corporation, Waterloo, Wis.

[21] Appl. No.: 697,828

[22] Filed: Aug. 30, 1996

[51] Int. Cl.$^6$ ............................................. B62J 1/18
[52] U.S. Cl. ........................ 297/214; 297/202; 297/201
[58] Field of Search ......................... 297/195.1, 214, 297/314, 201, 202, 212

[56] References Cited

U.S. PATENT DOCUMENTS

| | | | |
|---|---|---|---|
| 615,077 | 11/1898 | Lovekin | 297/414 |
| 823,915 | 8/1906 | Brooks et al. | 297/212 |
| 2,770,287 | 11/1956 | Christensen | 297/314 |
| 3,708,201 | 1/1973 | Lamkemeyer | 297/214 |
| 3,815,953 | 6/1974 | Worley . | |
| 4,662,677 | 5/1987 | Hughes . | |
| 4,768,826 | 9/1988 | Kashima . | |
| 4,850,643 | 7/1989 | Rollman . | |
| 5,165,752 | 11/1992 | Terry | 297/214 |
| 5,356,198 | 10/1994 | Hughes | 297/214 |
| 5,388,887 | 2/1995 | Read . | |
| 5,395,155 | 3/1995 | Yach . | |
| 5,451,071 | 9/1995 | Pong et al. . | |
| 5,524,961 | 6/1996 | Howard . | |

Primary Examiner—Peter R. Brown
Assistant Examiner—Anthony D. Barfield
Attorney, Agent, or Firm—Nilles & Nilles, S.C.

[57] ABSTRACT

An off-road bicycle having a resilient nose for cushioning impacts when a rider shifts his weight forward on a bicycle. The saddle, constructed from a shell having a relatively narrow nose and wide rear section and a suspension rail attached to the front and rear parts of the seat, includes a resilient pad placed underneath the nose between the shell and the front end of the rail. A rigid shim placed over the rail distributes a load from the rail across a substantial surface area of the pad.

8 Claims, 2 Drawing Sheets

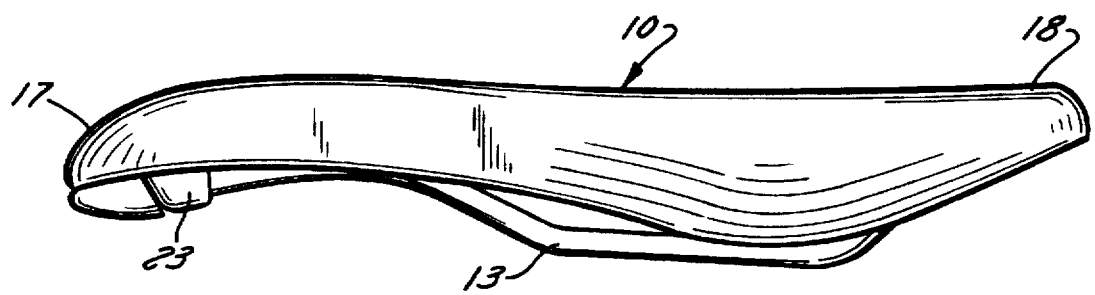
FIG. 1
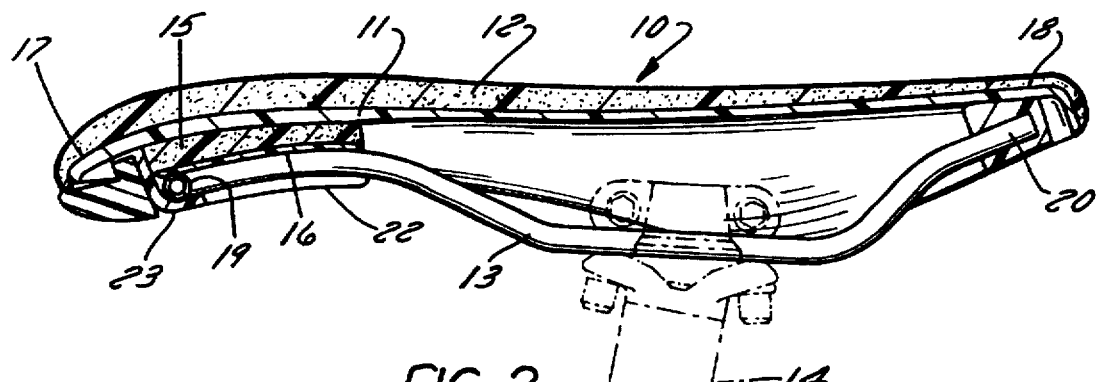
FIG. 2
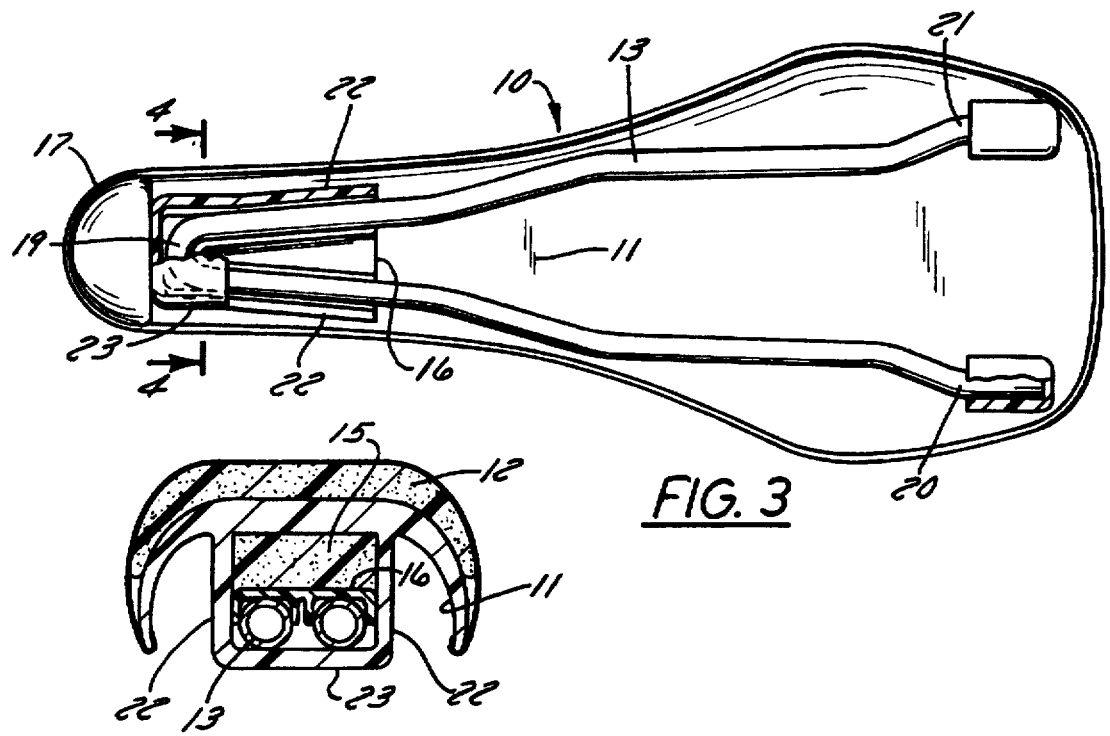
FIG. 3
FIG. 4

BICYCLE SADDLE HAVING RESILIENT FORWARD NOSE

BACKGROUND OF THE INVENTION

1. Field of the Invention

The present invention relates to a bicycle saddle having a resilient forward nose. In particular, present invention relates to a bicycle saddle especially designed for off-road cycling wherein the nose of the saddle includes a means for cushioning the forces encountered when the rider shifts his or her weight forward on the bicycle. 2. Background of the Related Art The popularity of off-road cycling has increased dramatically over the last decade. However, the riding conditions of off-road cycling are significantly more rugged than in road cycling, thus requiring the development of new, high performance parts for off-road bicycles. The initial designs for these parts often start with parts initially intended for road cycling. Road designs are often not optimal for the new applications and are subsequently improved as the shortcomings are exposed and understood. Saddles for off-road bicycles are typical of this development.

A traditional road saddle design is generally comprised of a plastic shell, padding, a leather cover, and a suspension rail for mounting the saddle on the bicycle. The rail is made from a piece of relatively thick metal wire (e.g. about ¼ inch diameter), bent into a complex shape. The rail is attached to the shell by inserting it under a moderate preload compression into sockets molded into the forward and rear edges of the shell. Foam padding is applied to the outer surface of the shell, and the cover, usually leather, is applied over the padding.

The preload secures and stiffens the shell slightly. The rails are slightly longer than the maximum distance between the front sockets, causing the rails to deflect slightly when they are seated into the sockets. The rider's pelvis normally bears on the saddle near the center when viewed from the side view. The padding deforms elastically to provide a cushion for the rider, and the shell elastically deforms a small amount under this load to provide additional cushioning.

The traditional saddle design discussed above is light, strong and well suited for road cycling because the rider is usually seated in the center of the saddle and his or her weight bears down on the precise area which provides the most support and cushioning. However, in off-road cycling, the rider must ride in a wider range of positions on the saddle because of the variations in terrain encountered. The rider cannot always sit in the center of the saddle because this position does not provide the weight distribution needed to balance the bicycle and maintain traction when climbing a steep incline on loose or irregular surfaces. In an extreme case the rider must sit far forward on the nose of the saddle.

A traditional road saddle typically has very poor cushioning in this area. Because the nose of the saddle is narrower than the mid or rear portions and the area of contact with the rider is reduced, there is an increase in the bearing pressure between the rider's crotch and the saddle. Furthermore, the forward most portion of the shell, i.e., the area more or less directly over the forward rail attachment socket, is very hard. The rail is extremely stiff compared to the elastic properties of the saddle in the central area, and the shell contributes progressively less deflection as the rider's weight is shifted forward. As a result, the rider must sit on a very narrow, uncushioned, inflexible seating surface, which can be very uncomfortable especially on rough terrain.

Given the priority that off-road cycling enthusiasts put on durability and light weight, such enthusiasts desire a more comfortable saddle for off-road use but are unwilling to decrease its strength or increase its weight. Consequently, there is a need for a new off-road saddle bicycle that retains the high strength/low weight characteristics of traditional road saddles, while increasing comfort.

SUMMARY OF THE INVENTION

An improved bicycle saddle for off-road cycling is presented. Specifically, the new bicycle saddle disclosed herein includes a means for coupling the front end of the suspension rail to the nose of the saddle in such a manner as to provide resilient movement of the nose relative to the saddle when the rider shifts his or her weight forward on the bicycle.

The invention presented herein incorporates an elastomer or foam cushion between the rail and shell which extends the length of the engagement between them. The connection further includes a shim between the rail and cushion so that the load on the rail is distributed across the entire surface of the cushion in order to take full advantage of its cushioning capabilities.

The improved design eliminates the "hard points" previously encountered when a rider shifts his or her weight onto the nose of the saddle. The nose of the shell is not rigidly held by the socket, but is allowed to deflect uniformly under the load and conform to the load distribution. The stiffness of the saddle is much lower than traditional saddles so the rider is more comfortable while sitting on the nose.

The forward socket on the underside of the shell is deep enough to allow for a substantial thickness of padding material to be inserted between the rail and shell. The side walls of the socket extend back along the length of the shell to guide the pad and keep it in place in use.

When the rider sits in the center of the new saddle it performs in a way that is very similar to a traditional saddle. However, the new design differs from a traditional saddle because it allows the nose of the shell to deflect in response to the loads applied to it directly above the forward socketed connection in a controlled and desirable way. When a rider sits far forward on the saddle, the resilient padding between the rail and shell lets the nose of the saddle deflect in response to the rider's pelvis. The shell can conform of the rider, without hard points directly above the socketed connection. The shim between the rail and foam pad is used to distribute the load between the rails and the pad. The socket, pad and rail attachment means disclosed herein for the nose of the saddle could also be used in the same sort of combination at the rear of the saddle to obtain the same advantage.

The primary objects of the invention are therefore to provide an improved bicycle saddle design having a resilient, padded forward nose for use in off-road cycling; to provide a means for distributing and cushioning a load on the nose of a bicycle saddle; and to provide a high strength, light weight yet comfortable design for an off-road bicycle saddle.

Other objects and advantages of the invention will become apparent from the following description which, taken in conjunction with the accompanying drawings, set forth by way of illustration and example certain embodiments of this invention.

BRIEF DESCRIPTION OF THE DRAWINGS

The drawings, which constitute part of this specification and include exemplary embodiments of the present invention, include the following:

FIG. 1 is a profile view of the bicycle saddle of the present invention;

FIG. 2 is a cross-section view of the bicycle saddle;

FIG. 3 is a partial sectional, bottom view of the bicycle saddle;

FIG. 4 is a cross-section view, with reference to line 4—4 of FIG. 3, of the nose of the bicycle saddle;

DETAILED DESCRIPTION OF THE INTENTION

Figure 5:
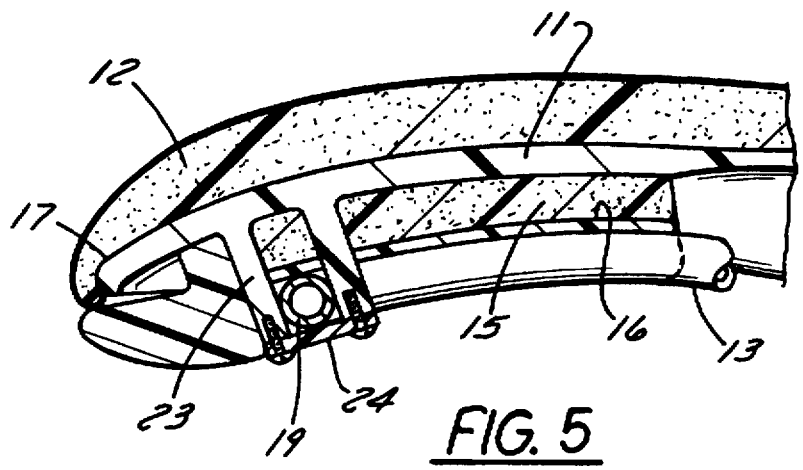
FIG. 5 is a partial cross-sectional view of a further embodiment of the present invention.

Referring to FIGS. 1–4, the bicycle saddle 10 of the present invention essentially comprises a shell 11, padding 12 covering the shell, 9 suspension rail 13 for mounting the saddle onto a bicycle 14, a resilient pad 15 for providing resilient movement of the nose relative to the front part of the suspension rail, and a shim 16 for distributing the load from the suspension rail across a substantial surface area of the resilient pad.

Specifically, the bicycle saddle is comprised of a relatively stiff, yet slightly flexible, plastic shell 11 for providing a seating surface. The shell 11 has a relatively narrow anterior portion or front part, commonly referred to as the "nose" 17, which becomes progressively narrower towards its front end. The shell further comprises a relatively wide posterior portion or rear part 18 to form the seat. Without limiting the invention to specific dimensions, the nose is about 1 inch to 2½ inches wide, and in any event, the nose is of a size and shape which fits comfortably between the crotch of a bicycle rider; the rear part of the seat is about 4 to 6 inches wide, and in any event the rear part is of a size and shape suitable for supporting the buttocks of a rider. Foam padding 12 covers the entire seating surface of the shell 11, and the padding 12 is further covered with leather or other suitable material.

The bicycle saddle 10 further comprises a suspension rail 13 for attaching the saddle to the bicycle. Specifically, the rail comprises a substantially V-shaped metal wire bent at an apex 19, with the apex attached underneath the nose 17 of the saddle. The tips of the wire form a first end 20 and second end 21 of the wire attached under the rear part 18 of the saddle 10. For purposes of describing the present invention, the two legs of the apex 19 are considered the front end or front portion of the suspension rail 13, and the first and second ends of the wire are considered the rear end or rear portion of the rail.

The front portion 19 of the rail 13 is attached to the shell by an anterior coupling means underneath the nose 17 of the saddle, and the rear portion 20/21 of the rail is attached by a posterior coupling means underneath the rear part 18 of the saddle. The anterior coupling means includes a means for providing resilient movement of the nose 17 when the rider shifts his or her weight to the front part of the saddle 10. Specifically, a resilient pad or cushion 15 is positioned underneath the nose 17 of the saddle directly between the underside of the shell 11 and the upper part of the front portion 19 of the rail. The resilient pad 15 is not placed just over the front tip of the apex 19, but instead the pad is large enough to cover a significant portion of the rail 13 in order to provide a reasonably sufficient cushioning effect to the rider. Again, without limiting the invention to specific dimensions, the resilient pad covers at least about 1 to 3 inches of the front portion of the saddle 13.

In order to take full advantage of the cushioning effect of the resilient pad 15, a rigid member or shim 16 is placed between the resilient pad 15 and the front portion of the rail 13 in order to distribute the load from the rail over a substantial area of the pad. The rigid shim 16 provides a broad surface area which bridges over the two legs of the V-shaped apex 19 of the rail. Looking for example at FIG. 4, the surface area of the upper curved portion of the rail 13 is relatively small compared to the width of the resilient pad 15. The shim is used to distribute the load from the small area across a much wider area. Specifically, the area of surface contact between the underside of the resilient pad 15 and the upper side of the shim 16 is several times greater than the area of surface contact between the upper curved portion of the rail 13 and the underside of the shim 16. Because the shim 16 is very rigid, a load from the front portion of the rail 13 is distributed across the entire width of the resilient pad 15.

Vertical walls 22 extending downward from the underside of the nose of the shell 11 form a recessed area for containing the resilient pad 15, shim 16 and front portion 19 of the rail. The walls are deep enough and long enough to retain the pad and shim in place and to control movement of the rail. The rails are substantially parallel to the underside of the shell in the forward portion of the saddle. In a slightly modified, alternative embodiment of the invention, the rails and underside of the shell diverged slightly in order to deflect the shell slightly more in the areas of increased distance between them. In further alternative embodiments of the invention, the pad may also wrap around the side of the rail to provide resilient lateral movement (i.e. side to side movement) of the nose of the saddle.

Figure 6:
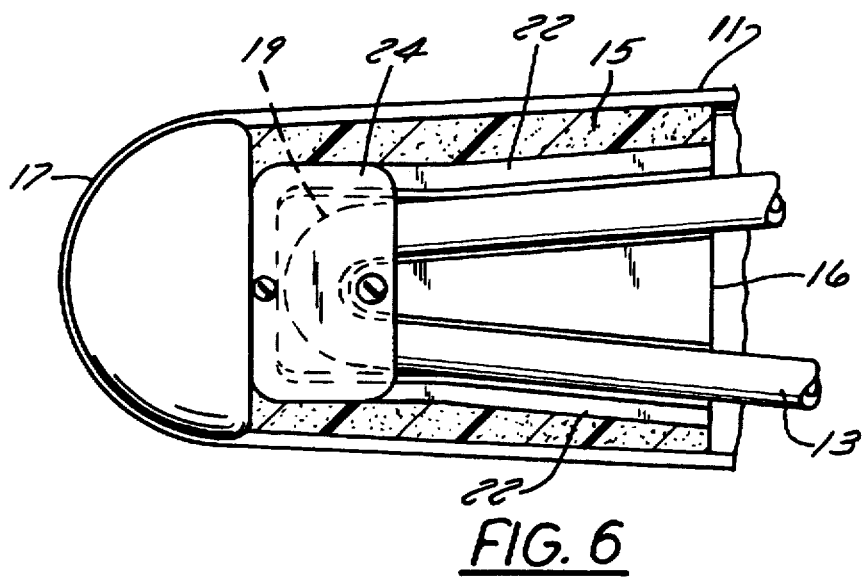
FIG. 6 is a bottom view of the second embodiment of the invention.
Figure 7:
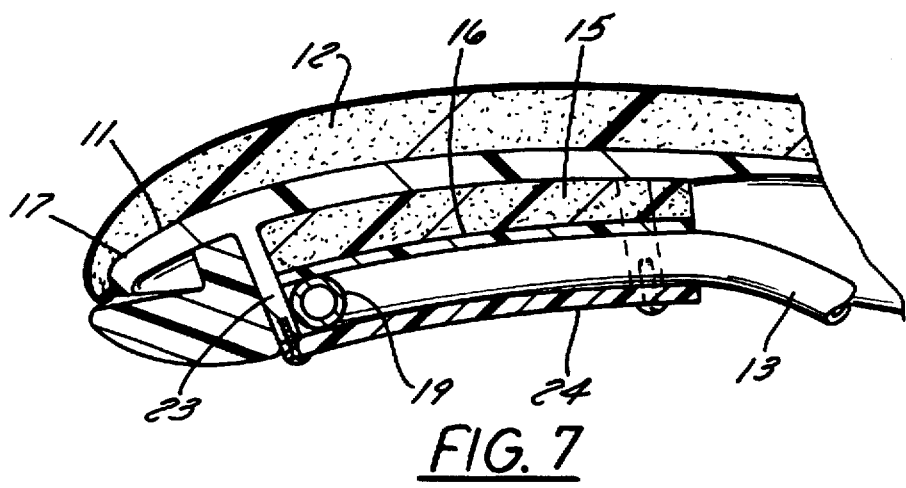
FIG. 7 is a cross-section view of a further embodiment of the present invention.

Several methods may be employed to attach the front portion of the rail to the nose of the saddle. For example, as shown in FIGS. 2 and 3, the anterior coupling means may comprise a socket 23 molded directly into the shell. Alternatively, as shown in FIGS. 5, 6 and 7, the front portion of the rail may be placed into a recessed area in the nose of the saddle, and a cover plate 24 fastened over the recessed area. Other suitable methods for securing the rail to the saddle maybe employed.

The bicycle saddle of the present invention thus combines the high strength, durability and lightweight characteristics of a traditional road saddle with the comfort of a resilient nose to provide an improved bicycle saddle designed especially for the for off-road cycling enthusiast. Specifically, when a rider is seated in the normal position, the rider's weight will bear down on a central portion of the saddle i.e., the area between the nose and extreme rear end of the saddle. In this area, the rider receives the benefits of the cushioning on the upper surface of the shell, and also from the fact that in this area the shell is able to flex slightly. However, when the rider shifts his or her weight to the front part of the seat, the resilient pad between the nose of the shell and the front end of the suspension rail provides a cushioning effect against impacts encountered in rugged terrain.

Although the bicycle saddle of the present invention has been described with specific reference to certain dimensional parameters, methods of coupling the suspension rail to the shell of the saddle, and so forth, alternative means may be employed so long as they perform substantially the same function in substantially the same way to achieve substantially the same result. Therefore, specific structural and functional details disclosed above are not to be interpreted as limiting the scope of the invention, but merely as a basis for the claims and for teaching one skilled in the art to variously employ the present invention in any appropriately detailed manner. Changes may be made in the details of manufacture or structure of the invention without departing from the spirit of the invention, especially as defined in the following claims.

I claim:

1. A bicycle saddle for seating a bicycle rider, said bicycle saddle comprising:

a shell, said shell having an upper surface and an underside, and said shell including a relatively narrow anterior portion which fits between said bicycle rider's crotch and a relatively wider posterior portion for supporting said bicycle rider's buttocks;

padding covering the upper surface of said shell;

a suspension rail for mounting said bicycle saddle to a bicycle, said rail comprising a substantially V-shaped metal wire having a first end, a second end, and an apex, with the first end and second end being coupled to the posterior portion of the shell, and the apex being coupled to the anterior portion of shell;

a resilient pad placed underneath the underside of the anterior portion of the shell; and a substantially rigid shim placed between the resilient pad and the apex of the suspension rail;

wherein a vertical force applied to the anterior portion of said bicycle saddle is cushioned by the resilient pad, and wherein a force applied by the suspension rail is distributed by the substantially rigid shim across a substantial surface area of the resilient pad.

2. The bicycle saddle of claim 1, wherein:

the apex of the V-shaped metal rail comprises a first leg section and a second leg section;

the rigid shim comprises a board surface area which bridges over the first and second leg sections of the rail; and the resilient paid covers the broad surface area of the rigid shim.

3. The bicycle saddle of claim 1, wherein the resilient pad further extends around a side portion of the apex of said rail for providing resilient lateral movement of said bicycle saddle.

4. A bicycle saddle comprising:

a shell, said shell having a nose section which becomes narrow towards its front end and a rear part having a larger width than said nose section;

padding covering an upper surface of said shell;

a suspension rail for attaching the saddle to a bicycle, said rail having a substantially V-shaped front end coupled underneath the nose section of the shell, and a rear end coupled to the rear part of the shell;

a resilient pad underneath the nose section of the shell for providing resilient movement of the nose section relative to said rail; and a rigid shim for distributing a force applied by said rail across a substantial surface area of said resilient pad, said shim bridging over the substantially V-shaped front end of the rail and being between the front end of the rail and the resilient pad.

5. The bicycle saddle of claim 4, wherein the area of surface contract between the resilient member and the rigid shim is several times greater than the area of surface contact between the rigid shim and the rail.

6. The bicycle saddle of claim 4, wherein the resilient paid further extends around a side portion of the suspension rail for providing resilient lateral movement of said bicycle saddle.

7. In a saddle for a bicycle:

said saddle having a front part and a rear part;

said front part having a nose section which becomes narrow towards its front end;

said rear part having a larger width portion to form a seat;

said saddle having a suspension rail for attaching said saddle to said bicycle and said saddle further comprising downwardly extending walls which extend underneath said suspension rail said suspension rail having a forward portion attached to the nose sections of the saddle, and a rearward portion attached to the rear part of the saddle;

foam padding between the nose section of said saddle and the forward portion of said suspension rail for providing resilient movement of the nose section relative to the forward portion of said rail, and a rigid shim between the foam padding and forward portion of the suspension rail for distributing a load applied by the rail across a substantial surface area of said padding.

8. The saddle of claim 7, wherein the foam padding further extends around said forward portion of the suspension rail for providing resilient lateral movement of said saddle.

* * * * *